United States Patent
Hudzia et al.

(10) Patent No.: US 9,886,301 B2
(45) Date of Patent: Feb. 6, 2018

(54) PROBABILISTIC DEDUPLICATION-AWARE WORKLOAD MIGRATION

(71) Applicant: Strato Scale Ltd., Herzlia (IL)

(72) Inventors: Benoit Guillaume Charles Hudzia, Belfast (GB); Alexander Solganik, Kfar-Saba (IL)

(73) Assignee: STRATO SCALE LTD., Herzliya (IL)

( * ) Notice: Subject to any disclaimer, the term of this patent is extended or adjusted under 35 U.S.C. 154(b) by 40 days.

(21) Appl. No.: 15/086,123

(22) Filed: Mar. 31, 2016

(65) Prior Publication Data

US 2016/0328257 A1 Nov. 10, 2016

Related U.S. Application Data

(60) Provisional application No. 62/156,347, filed on May 4, 2015.

(51) Int. Cl.
*G06F 9/46* (2006.01)
*G06F 9/455* (2006.01)
*G06F 17/30* (2006.01)
*G06F 9/50* (2006.01)
*G06F 3/06* (2006.01)

(52) U.S. Cl.
CPC ........ *G06F 9/45558* (2013.01); *G06F 9/5088* (2013.01); *G06F 17/30327* (2013.01); *G06F 17/30371* (2013.01); *G06F 17/30498* (2013.01); *G06F 3/0641* (2013.01); *G06F 2009/4557* (2013.01); *G06F 2009/45583* (2013.01)

(58) Field of Classification Search
CPC .............. G06F 9/45558; G06F 9/5088; G06F 17/30327; G06F 17/30371; G06F 17/30498; G06F 3/0641; G06F 2009/4557; G06F 2009/45583

USPC ............................................................ 718/1
See application file for complete search history.

(56) References Cited

U.S. PATENT DOCUMENTS

| 9,639,548 B2* | 5/2017 | Bawaskar ......... G06F 17/30153 |
| 9,712,610 B2* | 7/2017 | Ramasubramanian ............................ H04L 67/1023 |
| 2004/0221126 A1* | 11/2004 | Peinado .................. G06F 21/79 711/203 |

(Continued)

OTHER PUBLICATIONS

Candes et al.,"Robust Principal Component Analysis?", Journal of the ACM, vol. 58, issue 3, article 11, 37 pages, May 2011.

(Continued)

*Primary Examiner* — Camquy Truong
(74) *Attorney, Agent, or Firm* — D. Kligler IP Services Ltd.

(57) ABSTRACT

A computing method includes running, on a plurality of compute nodes, multiple workloads that access respective sets of memory pages. Respective bitmaps are calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads. A decision is made to migrate a selected workload from a source compute node to a destination compute node, based on one or more of the bitmaps.

19 Claims, 3 Drawing Sheets

(56) References Cited

U.S. PATENT DOCUMENTS

| | | | |
|---|---|---|---|
| 2006/0224914 A1 | 10/2006 | Blaum et al. | |
| 2007/0101082 A1* | 5/2007 | Sugiura | G06F 3/061 |
| | | | 711/165 |
| 2012/0198447 A1 | 8/2012 | Osogami et al. | |
| 2012/0324114 A1 | 12/2012 | Dutta et al. | |
| 2014/0196037 A1 | 7/2014 | Gopalan | |
| 2014/0244927 A1 | 8/2014 | Goldberg et al. | |
| 2015/0007196 A1* | 1/2015 | Toll | G06F 9/5083 |
| | | | 718/105 |

OTHER PUBLICATIONS

Flajolet et al., "HyperLogLog: the analysis of a near-optimal cardinality estimation algorithm", Conference on Analysis of Algorithms (AofA 07), DMTCS proceedings AH, pp. 127-146, 2007.

VMware Virtualization, 8 pages, year 2014.

Chen et al., "Distinct Counting with a Self-Learning Bitmap", Cornell University Library, arXiv:1107.1697v1, 40 pages, Jul. 8, 2011.

European Application # 16164920.7 Search report dated Oct. 11, 2016.

European Application # 16198338.2 Search report dated Mar. 15, 2017.

European Application # 16198330.9 Search report dated Apr. 26, 2017.

* cited by examiner

US 9,886,301 B2

PROBABILISTIC DEDUPLICATION-AWARE WORKLOAD MIGRATION

FIELD OF THE INVENTION

The present invention relates generally to computing systems, and particularly to methods and systems for migration of Virtual Machines (VMs) and other workloads.

BACKGROUND OF THE INVENTION

Machine virtualization is commonly used in various computing environments, such as in data centers and cloud computing. Various virtualization solutions are known in the art. For example, VMware, Inc. (Palo Alto, Calif.), offers virtualization software for environments such as data centers, cloud computing, personal desktop and mobile computing.

SUMMARY OF THE INVENTION

An embodiment of the present invention that is described herein provides a computing method including running, on a plurality of compute nodes, multiple workloads that access respective sets of memory pages. Respective bitmaps are calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads. A decision is made to migrate a selected workload from a source compute node to a destination compute node, based on one or more of the bitmaps.

In some embodiments, deciding to migrate the selected workload includes choosing one or both of the selected workload and the destination compute node, based on a selection criterion that is defined over one or more of the bitmaps and aims to maximize the overlap between the memory pages used by the selected workload and the memory pages used by existing workloads on the destination compute node. In an example embodiment, the selection criterion aims to maximize a number of the memory pages that are used by the selected workload and can be deduplicated on the destination compute node following migration of the selected workload. In another embodiment, calculating the bitmaps includes calculating a node-level bitmap for the destination compute node by calculating the union of the bitmaps of the existing workloads on the destination node, and deciding to migrate the workload includes evaluating the selection criterion based on the node-level bitmap of the destination compute node.

In some embodiments, deciding to migrate the workload includes choosing one or both of the source compute node and the selected workload, based on a selection criterion that is defined over one or more of the bitmaps and aims to minimize the overlap between the memory pages used by the selected workload and the memory pages used by existing workloads on the source compute node. In an example embodiment, the selection criterion aims to minimize a number of the memory pages that are used by the existing workloads on the source compute node and can no longer be deduplicated on the source compute node following migration of the selected workload. In another embodiment, calculating the bitmaps includes calculating a node-level bitmap for the source compute node by calculating the union of the bitmaps of the existing workloads on the source node, and deciding to migrate the workload includes evaluating the selection criterion based on the node-level bitmap of the destination compute node.

In some embodiments, calculating a bitmap for a given workload includes calculating respective hash values over at least some of the memory pages used by the given workload, and calculating the bitmap based on the hash values. Calculating the bitmap may include evaluating the bitmap over the hash values of only the memory pages that are modified by the given workload less frequently than a predefined modification rate.

In an embodiment, calculating the bitmaps includes calculating HyperLogLog (HLL) bitmaps. In a disclosed embodiment, deciding to migrate the selected workload is performed in response to detecting that the source compute node is overloaded.

There is additionally provided, in accordance with an embodiment of the present invention, a computing apparatus including an interface and a processor. The interface is configured for communicating with a plurality of compute nodes, which run multiple workloads that access respective sets of memory pages. The processor is configured to receive from the compute nodes bitmaps calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads, and to decide to migrate a selected workload from a source compute node to a destination compute node based on one or more of the bitmaps.

There is further provided, in accordance with an embodiment of the present invention, a computing system including a plurality of compute nodes and a processor. The compute nodes are configured to run multiple workloads that access respective sets of memory pages, and to calculate respective bitmaps for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads. The processor is configured to receive the bitmaps from the compute nodes and to decide, based on one or more of the bitmaps, to migrate a selected workload from a source compute node to a destination compute node.

The present invention will be more fully understood from the following detailed description of the embodiments thereof, taken together with the drawings in which:

DETAILED DESCRIPTION OF EMBODIMENTS

Overview

Figure 1:
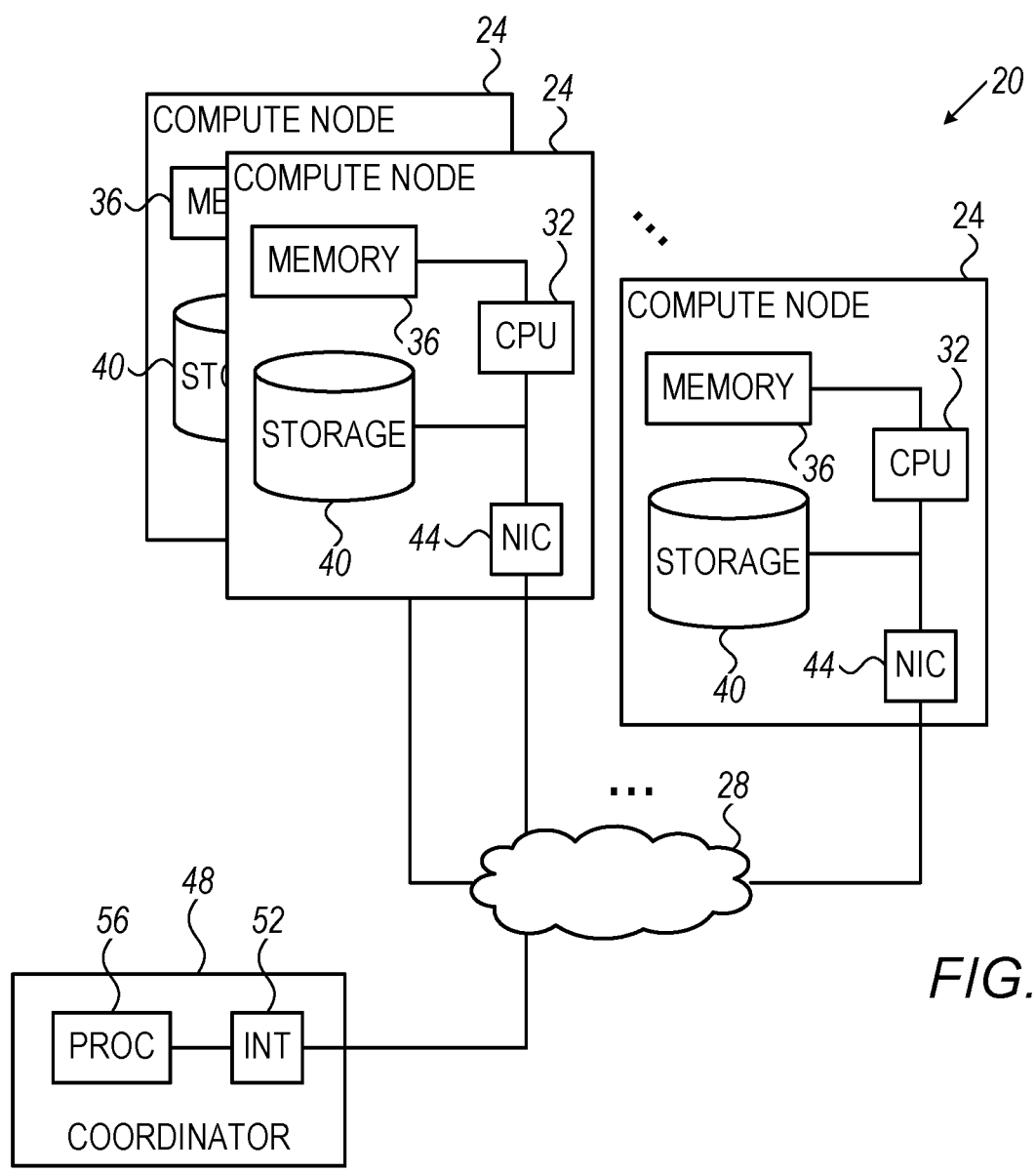
FIG. 1 is a block diagram that schematically illustrates a computing system, in accordance with an embodiment of the present invention.

Embodiments of the present invention that are described herein provide improved methods and systems for migrating Virtual Machines (VMs) and other workloads from one compute node to another, e.g., for load balancing.

In the disclosed embodiments, a coordination process, referred to as a "coordinator," makes migration decisions based on statistical selection criteria relating to the sets of memory pages used by the VM to be migrated, the intended destination node and/or the source node on which the VM currently runs. The selection criteria aim to improve the performance of local deduplication processes carried out by the nodes.

In the context of the present patent application and in the claims, the term "migration" refers to any operation that causes a workload, which operates or previously operated on a certain compute node (referred to as a source node) to resume operation or otherwise operate on a different compute node (referred to as a destination node). One type of migration is live migration, in which a running workload is moved together with its current state from one node to another during operation. Another type of migration is placement of a workload that ran in the past but is currently stopped, suspended or put in snapshot mode. Alternatively, the disclosed techniques can be used for performing any other suitable kind of migration.

In some embodiments, the coordinator chooses the VM to be migrated, and/or the destination node, so as to maximize the overlap between the memory pages used by the VM and the memory pages used by the VMs already running on the destination node. This criterion increases the number of pages that can be deduplicated on the destination node. As a result, the destination node memory is used more efficiently.

Additionally or alternatively, the coordinator may choose the VM to be migrated, and/or the source node, so as to minimize the degradation in duplication efficiency on the source node caused by the migration. For example, the coordinator may choose to migrate a VM whose memory pages have minimal overlap with the memory pages used by the other VMs running on the source node.

In some embodiments, deduplication on the various nodes is applied only to memory pages whose content does not change frequently. Such memory pages are referred to as "cold pages," as opposed to "hot pages" that are written to frequently. Thus, in some embodiments the coordinator applies the disclosed selection criteria while considering only the cold pages of the VMs and nodes.

In order to make sensible migration decisions, the coordinator estimates the overlap between the memory pages used by the VM to be migrated and the memory pages used by the VMs running on various candidate destination nodes (e.g., to maximize deduplication gain). The coordinator may also estimate the overlap between the memory pages used by the VM to be migrated and the memory pages used by the VMs running on the source node (e.g., to minimize deduplication loss). For establishing these estimates, the coordinator typically uses hash values calculated over the content of the various memory pages, possibly the same hash values used for the actual deduplication.

In principle, it is possible to evaluate the overlap between two sets of memory pages (e.g., the memory pages of a VM and the memory pages of a node) by exhaustively comparing the hash values of the two sets. This naive solution, however, is very computationally intensive and requires the nodes to communicate large volumes of metadata to the coordinator. Such a solution is not scalable, and may be prohibitive in large clusters of compute nodes that run large numbers of VMs.

Instead, in some disclosed embodiments the coordinator represents each set of memory pages (e.g., the memory pages of a VM or of a node) by a compact bitmap calculated over the hash values of the memory pages in the set. One example of a suitable bitmap is the HyperLogLog (HLL) bitmap described by Flajolet et al., in "HyperLogLog: the analysis of a near-optimal cardinality estimation algorithm," 2007 Conference on Analysis of Algorithms (AofA 07), Discrete Mathematics and Theoretical Computer Science (DMTCS), Nancy, France, 2007, which is incorporated herein by reference.

The HLL bitmap has the following characteristics, which make it suitable for assessing overlaps between memory pages:

A bitmap of a set of memory pages is statistically indicative of the cardinality of the set, i.e., of the number of unique memory pages in the set.

A union of bitmaps is statistically indicative of the cardinality of the union of the corresponding sets of memory pages.

An intersection of bitmaps is statistically indicative of the cardinality of the overlap between the corresponding sets of memory pages, i.e., of the number of memory pages that are common to the sets.

The HLL bitmap is extremely compact, and at the same time provides good statistical estimation of the overlap. The embodiments described herein refer mainly to HLL, but the disclosed techniques can be used with other suitable metrics that have the above characteristics.

In an example embodiment, each compute node periodically calculates or updates the HLL bitmaps of the VMs it runs, and the overall HLL bitmap of the node (the union of the bitmaps of the VMs running on the node), and sends the bitmaps to the coordinator. The coordinator uses the bitmaps of the various nodes and VMs for deciding which VMs to migrate, and to which destination nodes. A migration process may be triggered in response to detecting an overloaded node, or for any other reason.

Since the disclosed techniques are based on a compact statistical bitmap rather than on exhaustive comparison of memory-page hash values, they are extremely memory efficient and incur little computational load and communication overhead. At the same time, since the bitmap provides good statistical accuracy, the disclosed techniques enable the coordinator to migrate VMs in a manner that optimizes the deduplication performance.

SYSTEM DESCRIPTION

FIG. 1 is a block diagram that schematically illustrates a computing system 20, which comprises a cluster of multiple compute nodes 24, in accordance with an embodiment of the present invention. System 20 may comprise, for example, a data center, a cloud computing system, a High-Performance Computing (HPC) system or any other suitable system.

Compute nodes 24 (referred to simply as "nodes" for brevity) typically comprise servers, but may alternatively comprise any other suitable type of compute nodes. System 20 may comprise any suitable number of nodes, either of the same type or of different types. Nodes 24 are also referred to as physical machines.

Nodes 24 are connected by a communication network 28, typically a Local Area Network (LAN). Network 28 may operate in accordance with any suitable network protocol, such as Ethernet or Infiniband. In the embodiments described herein, network 28 comprises an Internet Protocol (IP) network.

Each node 24 comprises a Central Processing Unit (CPU) 32. Depending on the type of compute node, CPU 32 may comprise multiple processing cores and/or multiple Integrated Circuits (ICs). Regardless of the specific node configuration, the processing circuitry of the node as a whole is regarded herein as the node CPU. Each node further comprises a memory 36 (typically a volatile memory such as Dynamic Random Access Memory—DRAM) and a Network Interface Card (NIC) 44 for communicating with network 28. In some embodiments a node may comprise two or more NICs that are bonded together, e.g., in order to enable higher bandwidth. This configuration is also regarded herein as an implementation of NIC 44. Some of nodes 24 (but not necessarily all nodes) may comprise one or more non-volatile storage devices 40 (e.g., magnetic Hard Disk Drives —HDDs —or Solid State Drives —SSDs).

System 20 further comprises a coordinator node 48. Coordinator node 48 comprises a network interface 52, e.g., a NIC, for communicating with nodes 24 over network 28, and a processor 56 that is configured to carry out the methods described herein.

GENERATION OF HLL BITMAPS

Figure 2:
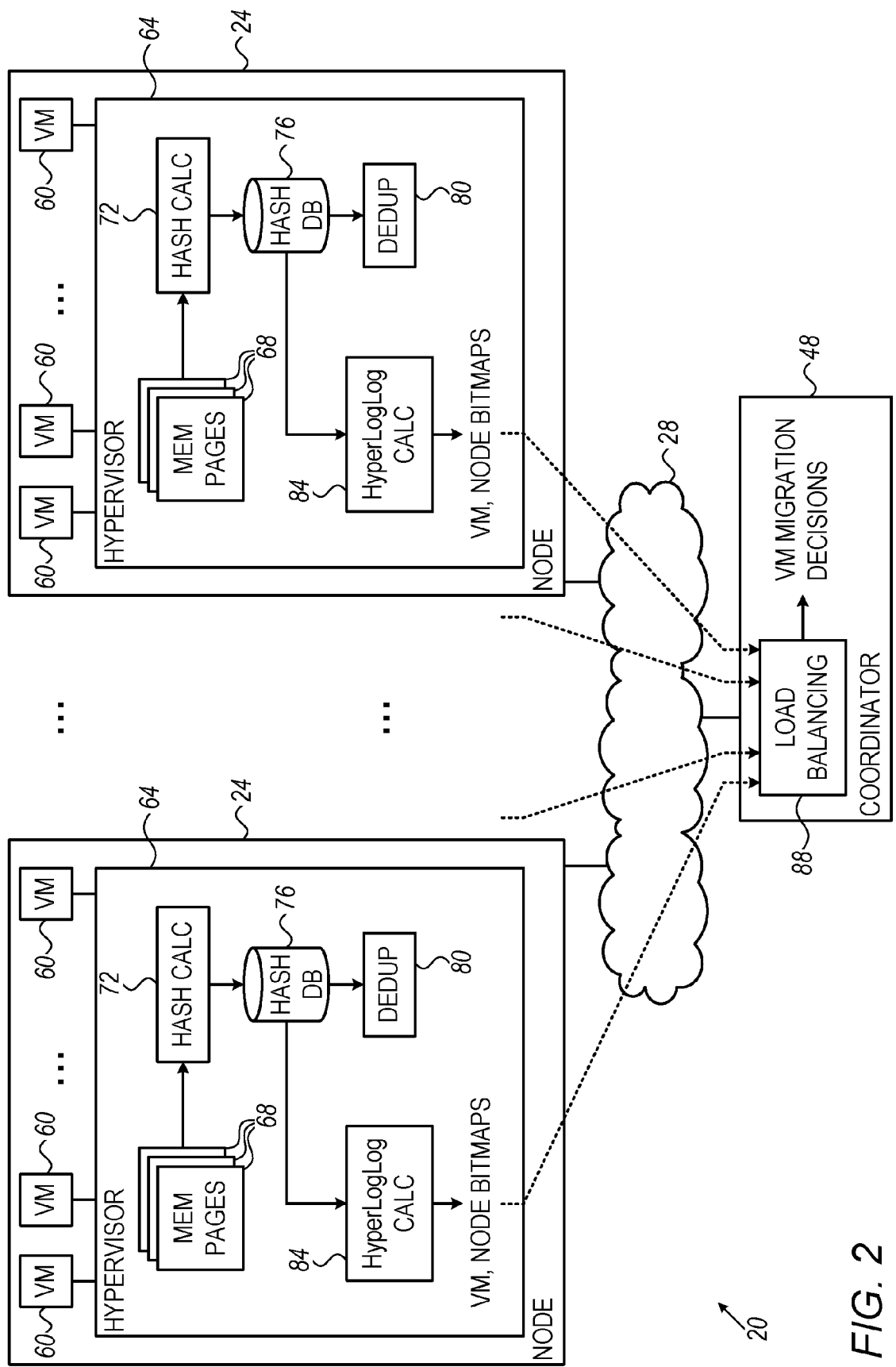
FIG. 2 is a block diagram that schematically illustrates elements of the computing system of FIG. 1, in accordance with an embodiment of the present invention.

FIG. 2 is a block diagram that schematically illustrates the internal structure of some of the elements of system 20, in accordance with an embodiment of the present invention. In the present example, each node 24 runs one or more Virtual Machines (VMs) 60.

A hypervisor 64, typically implemented as a software layer running on CPU 32 of node 24, allocates physical resources of node 24 to the various VMs. Physical resources may comprise, for example, computation resources of CPU 32, memory resources of memory 36, storage resources of storage devices 40, and/or communication resources of NIC 44.

Each VM 60 accesses a respective set of memory pages 68 that are stored in memory 36 of node 24. (Memory pages 68 are drawn in the figure as part of hypervisor 64 for the sake of clarity. The memory pages physically reside in memory 36 shown in FIG. 1, and are managed by hypervisor 64 running on CPU 32.)

Among its various tasks, hypervisor 64 in each compute node 24 performs deduplication among the memory pages used by the various VMs 60 of the compute node. In the present example, hypervisor 64 comprises a hash calculation module 72, a hash database 76 and a deduplication module 80. Hash calculation module 72 calculates a respective hash value over the content of each memory page 68, and stores the hash values in database 76. Any suitable hash function, such as MurmurHash, CityHash or SpookyHash, to name just a few examples, can be used for this purpose. Deduplication module 80 identifies memory pages 68 having the same hash value (and therefore having the same content with high likelihood) and discards duplicate copies of the content in memory 36.

In addition, each hypervisor 64 comprises a HyperLogLog (HLL) calculation module 84. Module 84 calculates a respective HLL bitmap for each VM (referred to herein as "VM bitmap"), and an overall HLL bitmap for the compute node 24 (referred to herein as "node bitmap"). The VM bitmap of a given VM is calculated over the hash values of at least some of memory pages 68 used by that VM. The node bitmap of a given compute node 24 is calculated as the union of the VM bitmaps of the VMs running on that compute node.

In some embodiments, hypervisor 64 calculates hash values only for cold pages of the VMs, and considers only the cold pages for deduplication. In these embodiments, module 84 may calculate the VM bitmaps only over the hash values of the cold pages of the VMs. A cold page is typically defined as a page that is modified (written to) infrequently, e.g., with less than a predefined rate of modifications.

In an embodiment, module 84 calculates the HLL bitmap over a set of hash values as follows:

The bitmap is made-up of multiple subsets of bits referred to as buckets. Any suitable number of buckets may be used.

Each hash value is mapped to one of the buckets. For example, the first or last several bits of the hash value can be used as an index of the bucket to which the hash value is mapped.

The value held in each bucket is the longest run of "0"s found among the hash values mapped to that bucket. (The bits used for mapping the hash values to the buckets are typically excluded when looking for the longest run of "0"s.)

When constructing the HLL bitmaps in this manner, the bitmaps have the following characteristics:

The bitmap of a set of memory pages is statistically indicative of the cardinality of the set, i.e., of the number of unique memory pages in the set.

A union of bitmaps is statistically indicative of the cardinality of the union of the corresponding sets of memory pages. The union of the bitmaps of sets A and B of memory pages is given by bitmap(A∪B)=bitmap(A)+bitmap(B). (The union of bitmaps is calculated bucket-by-bucket. If a certain bucket exists in only one of the bitmaps, the bucket with the value held therein is added to the union. If a certain bucket exists in two or more of the bitmaps, the bucket is added to the union with the maximal value among the bitmaps.)

An intersection of bitmaps is statistically indicative of the cardinality of the overlap between the corresponding sets of memory pages, i.e., of the number of memory pages that are common to the sets. The intersection of the bitmaps of sets A and B of memory pages is given by bitmap(A∩B)=bitmap(A)+bitmap(B)−bitmap(A∪B). (The intersection of two bitmaps is a bitmap consisting of the buckets that exist in both bitmaps. The value of each bucket in the intersection is the minimum of the two corresponding bucket values in the two bitmaps.)

Typically, HLL calculation module 84 in hypervisor 64 of each compute node 24 calculates the VM bitmaps of the VMs currently running in the compute node, and the overall node VM (the union of all VM bitmaps). Each compute node sends the VM bitmaps and node bitmap over network 28 to coordinator node 48. In a given compute node 24, the VM bitmaps and node bitmap may be calculated on demand in response to a request from coordinator node 48, or periodically with any suitable update rate. In one embodiment, the update rate depends on the churn rate of the set of cold pages of the compute node (i.e., the average rate with which memory pages are updated).

In some embodiments, module 84 recalculates the various HLL bitmaps from scratch every time. In alternative embodiments, module 84 updates the HLL bitmaps incrementally, e.g., in response to memory-page modification or hash recalculation. In these embodiments, module 84 may reset the incremental updating and recalculate some or all of the bitmaps from scratch, e.g., after a certain time period or after a certain number of incremental updates.

In an embodiment, coordinator node 48 comprises a load balancing module 88. In the system configuration of FIG. 1, load balancing module 88 runs on processor 56. Module 88 receives the VM bitmaps and node bitmaps from compute nodes 24, and uses them to make deduplication-aware VM migration decisions. Several examples of decision criteria are described further below. A migration decision typically involves selection of a source node, a VM running on the source node, and/or a destination node. Once a migration decision has been made, coordinator node 48 carries out the migration, i.e., moves the selected VM from the source node to the destination node.

The system, compute-node and coordinator-node configurations shown in FIGS. 1 and 2 are example configurations that are chosen purely for the sake of conceptual clarity. In alternative embodiments, any other suitable configurations can be used. For example, although the embodiments described herein refer mainly to virtualized data centers, the disclosed techniques can be used for communication between workloads in any other suitable type of computing system.

Although the embodiments described herein refer mainly to HLL, the disclosed techniques can be used with any other suitable bitmaps or Discrete-Value (DV) counting metrica having similar characteristics. Example alternative metrics may comprise SuperLogLog, LogLog and KVM. Yet another alternative is to use self-learning bitmaps, as described, for example, by Chen et al., in "Distinct Counting with a Self-Learning Bitmap," arXiv: 1107.1697v1, Jul. 8, 2011, which is incorporated herein by reference.

The functions of coordinator node 48 may be carried out exclusively by processor 56, i.e., by a node separate from compute nodes 24. Alternatively, the functions of coordinator node 48 may be carried out by one or more of CPUs 32 of nodes 24, or jointly by processor 56 and one or more CPUs 32. For the sake of clarity and simplicity, the description that follows refers generally to "a coordinator." The functions of the coordinator may be carried out by any suitable processor or processors in system 20. In one example embodiment, the disclosed techniques are implemented in a fully decentralized, peer-to-peer (P2) manner. In such a configuration, each node 24 maintains its local information (e.g., VM and node bitmaps) and decides which nodes ("peers") to interact with based on the surrounding peer information.

The various elements of system 20, and in particular the elements of nodes 24 and coordinator node 48, may be implemented using hardware/firmware, such as in one or more Application-Specific Integrated Circuit (ASICs) or Field-Programmable Gate Array (FPGAs). Alternatively, some system, compute-node or coordinator-node elements, e.g., elements of CPUs 32 or processor 56, may be implemented in software or using a combination of hardware/firmware and software elements.

Typically, CPUs 32, memories 36, storage devices 40, NICs 44, processor 56 and interface 52 are physical, hardware implemented components, and are therefore also referred to as physical CPUs, physical memories, physical storage devices physical disks, and physical NICs, respectively.

In some embodiments, CPUs 32 and/or processor 56 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Deduplication-Aware Migration and Load Balancing Based on HLL Bitmaps

In some embodiments, load balancing module 88 uses the VM and node bitmaps for making migration decisions that aim to improve the performance of the local deduplication processes carried out by the nodes.

In some embodiments, module 88 chooses the VM to be migrated, and/or the destination node, so as to maximize the overlap between the memory pages used by the VM and the memory pages used by the VMs already running on the destination node.

For example, when a particular compute node 24 becomes overloaded, module 88 may search for a candidate VM running on the overloaded node, and for a candidate destination compute node, for which the intersection bitmap $(V \cap N) = \text{bitmap}(V) + \text{bitmap}(N) - \text{bitmap}(V) \cup \text{bitmap}(N)$ is indicative of the largest cardinality, wherein bitmap(V) denotes the VM bitmap of the candidate VM, and bitmap(N) denotes the node bitmap of the candidate compute node.

This criterion increases the number of memory pages that can be deduplicated on the destination node. Once the VM and destination node that maximize the above expression are found, module 88 initiates migration of the selected VM to the selected destination node.

Additionally or alternatively, module 88 may choose the VM to be migrated, and/or the source node, so as to minimize the degradation in duplication efficiency on the source node caused by the migration. In other words, module 88 may choose to migrate the VM whose memory pages have minimal overlap with the memory pages used by the other VMs running on the overloaded node.

For example, when a particular compute node 24 becomes overloaded, module 88 may search for a candidate VM running on the overloaded node for which the intersection bitmap$(V \cap N) = \text{bitmap}(V) + \text{bitmap}(N) - \text{bitmap}(V) \cup \text{bitmap}$(N) is indicative of the smallest cardinality. In this example, bitmap(V) denotes the VM bitmap of the candidate VM, and bitmap(N) denotes the node bitmap of the overloaded compute node.

Further additionally or alternatively, module 88 may use any other suitable selection criterion, based on one or more VM bitmaps and/or more node bitmaps, to select a source compute node, a destination compute node and/or a VM to be migrated.

Figure 3:
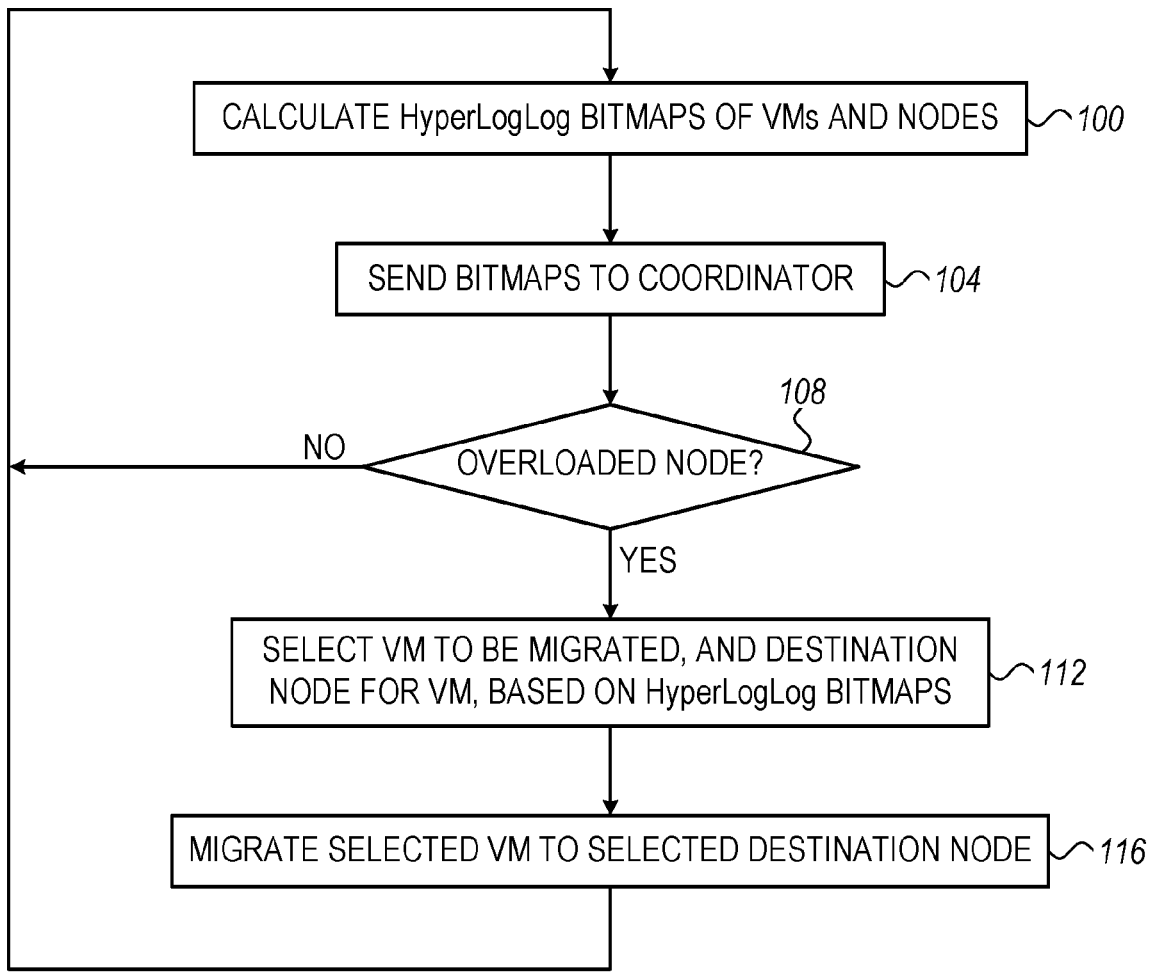
FIG. 3 is a flow chart that schematically illustrates a method for duplication-aware load balancing, in accordance with an embodiment of the present invention.

FIG. 3 is a flow chart that schematically illustrates a method for duplication-aware load balancing, in accordance with an embodiment of the present invention. The method begins with HyperLogLog calculation modules 84 in hypervisors 64 of the various compute nodes 24 calculating the HLL bitmaps of the various VMs and compute nodes, at a bitmap calculation step 100. The bitmaps are typically calculated over the hash values of the cold pages of the VMs. At a bitmap forwarding step 104, hypervisors 64 send the VM bitmaps and node bitmaps over network 28 to coordinator node 48.

At an overload checking step 108, load balancing module 88 in coordinator node 48 checks whether any of compute nodes 24 is overloaded. Module 88 may regard a compute node as overloaded, for example, if the amount of resources required exceeds a predefined threshold of resources available for operation. The threshold typically comprises a value deemed safe for operation, e.g., 80% of the resources for the VMs and 20% for system operations. In this example, if the amount of memory requested by the VMs exceeds 80% of the overall available memory, the node is regarded as overloaded. Alternatively, any other suitable definition of overload can be used. If the compute node is not overloaded, the method loos back to step 100 above.

If an overloaded compute node is found, module 88 selects a VM to be migrated from this compute node, and a destination node to which the VM is to be migrated, at a selection step 112. The selection is made based on the VM bitmaps and the node bitmaps, and aims to maximize the deduplication efficiency on the destination node and/or to minimize the deduplication loss on the overloaded node. At a migration step 116, module 88 initiates migration of the selected VM from the overloaded compute node to the selected destination node.

The method flow of FIG. 3 is an example flow that is depicted purely by way of example. In alternative embodiments, any other suitable flow can be used. For example, migration may be triggered by any other event or condition, not necessarily by detection of an overloaded compute node. As another example, the selection may use the disclosed techniques to select only a VM to be migrated (from a given source node to a given destination node), to select only a destination node (for a given VM on a given source node).

Although the embodiments described herein mainly address Virtual Machines (VMs), the methods and systems described herein can also be used in other applications, such as in migration and load balancing of other types of workloads that use memory pages, for example operating-system containers and processes. The disclosed techniques can also be used for storage deduplication.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing method, comprising:
running, on a plurality of compute nodes, multiple workloads that access respective sets of memory pages;
calculating respective bitmaps for at least some of the workloads, wherein:
  (i) a bitmap of a workload is statistically indicative of a cardinality of the set of memory pages used by the workload;
  (ii) a union of two or more bitmaps is statistically indicative of the cardinality of a union of the sets of memory pages used by the two or more corresponding workloads; and
  (iii) an intersection of first and second bitmaps is statistically indicative of an overlap between respective first and second sets of memory pages used by the corresponding workloads; and
deciding to migrate a selected workload from a source compute node to a destination compute node, based on one or more of the bitmaps,
wherein deciding to migrate the selected workload comprises choosing one or both of the selected workload and the destination compute node, based on a selection criterion that is defined over one or more of the bitmaps and aims to maximize the overlap between the memory pages used by the selected workload and the memory pages used by existing workloads on the destination compute node.

2. The method according to claim 1, wherein the selection criterion aims to maximize a number of the memory pages that are used by the selected workload and can be deduplicated on the destination compute node following migration of the selected workload.

3. The method according to claim 1, wherein calculating the bitmaps comprises calculating a node-level bitmap for the destination compute node by calculating the union of the bitmaps of the existing workloads on the destination node, and wherein deciding to migrate the workload comprises evaluating the selection criterion based on the node-level bitmap of the destination compute node.

4. The method according to claim 1, wherein calculating the bitmaps comprises calculating HyperLogLog (HLL) bitmaps.

5. The method according to claim 1, wherein deciding to migrate the selected workload is performed in response to detecting that the source compute node is overloaded.

6. A computing method, comprising:
running, on a plurality of compute nodes, multiple workloads that access respective sets of memory pages;
calculating respective bitmaps for at least some of the workloads, wherein:
  (i) a bitmap of a workload is statistically indicative of a cardinality of the set of memory pages used by the workload;
  (ii) a union of two or more bitmaps is statistically indicative of the cardinality of a union of the sets of memory pages used by the two or more corresponding workloads; and
  (iii) an intersection of first and second bitmaps is statistically indicative of an overlap between respective first and second sets of memory pages used by the corresponding workloads; and
deciding to migrate a selected workload from a source compute node to a destination compute node, based on one or more of the bitmaps,
wherein deciding to migrate the workload comprises choosing one or both of the source compute node and the selected workload, based on a selection criterion that is defined over one or more of the bitmaps and aims to minimize the overlap between the memory pages used by the selected workload and the memory pages used by existing workloads on the source compute node.

7. The method according to claim 6, wherein the selection criterion aims to minimize a number of the memory pages that are used by the existing workloads on the source compute node and can no longer be deduplicated on the source compute node following migration of the selected workload.

8. The method according to claim 6, wherein calculating the bitmaps comprises calculating a node-level bitmap for the source compute node by calculating the union of the bitmaps of the existing workloads on the source node, and wherein deciding to migrate the workload comprises evaluating the selection criterion based on the node-level bitmap of the destination compute node.

9. A computing method, comprising:
running, on a plurality of compute nodes, multiple workloads that access respective sets of memory pages;
calculating respective bitmaps for at least some of the workloads, wherein:
(i) a bitmap of a workload is statistically indicative of a cardinality of the set of memory pages used by the workload;
(ii) a union of two or more bitmaps is statistically indicative of the cardinality of a union of the sets of memory pages used by the two or more corresponding workloads; and
(iii) an intersection of first and second bitmaps is statistically indicative of an overlap between respective first and second sets of memory pages used by the corresponding workloads; and
deciding to migrate a selected workload from a source compute node to a destination compute node, based on one or more of the bitmaps,
wherein calculating a bitmap for a given workload comprises calculating respective hash values over at least some of the memory pages used by the given workload, and calculating the bitmap based on the hash values, and
wherein calculating the bitmap comprises evaluating the bitmap over the hash values of only the memory pages that are modified by the given workload less frequently than a predefined modification rate.

10. A computing apparatus, comprising:
an interface for communicating with a plurality of compute nodes, which run multiple workloads that access respective sets of memory pages; and
a processor, which is configured to receive from the compute nodes bitmaps calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads, and to decide to migrate a selected workload from a source compute node to a destination compute node based on one or more of the bitmaps,
wherein the processor is configured to choose one or both of the selected workload and the destination compute node, based on a selection criterion that is defined over one or more of the bitmaps and aims to maximize the overlap between the memory pages used by the selected workload and the memory pages used by existing workloads on the destination compute node.

11. The apparatus according to claim 10, wherein the selection criterion aims to maximize a number of the memory pages that are used by the selected workload and can be deduplicated on the destination compute node following migration of the selected workload.

12. The apparatus according to claim 10, wherein the processor is configured to calculate a node-level bitmap for the destination compute node by calculating the union of the bitmaps of the existing workloads on the destination node, and to evaluate the selection criterion based on the node-level bitmap of the destination compute node.

13. The apparatus according to claim 10, wherein the bitmaps comprise HyperLogLog (HLL) bitmaps.

14. The apparatus according to claim 10, wherein the processor is configured to decide to migrate the selected workload in response to detecting that the source compute node is overloaded.

15. A computing apparatus, comprising:
an interface for communicating with a plurality of compute nodes, which run multiple workloads that access respective sets of memory pages; and
a processor, which is configured to receive from the compute nodes bitmaps calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads, and to decide to migrate a selected workload from a source compute node to a destination compute node based on one or more of the bitmaps,
wherein the processor is configured to choose one or both of the source compute node and the selected workload, based on a selection criterion that is defined over one or more of the bitmaps and aims to minimize the overlap between the memory pages used by the selected workload and the memory pages used by existing workloads on the source compute node.

16. The apparatus according to claim 15, wherein the selection criterion aims to minimize a number of the memory pages that are used by the existing workloads on the source compute node and can no longer be deduplicated on the source compute node following migration of the selected workload.

17. The apparatus according to claim 15, wherein the processor is configured to calculate a node-level bitmap for the source compute node by calculating the union of the bitmaps of the existing workloads on the source node, and to evaluate the selection criterion based on the node-level bitmap of the destination compute node.

18. A computing apparatus, comprising:
an interface for communicating with a plurality of compute nodes, which run multiple workloads that access respective sets of memory pages; and
a processor, which is configured to receive from the compute nodes bitmaps calculated for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads, and to decide to migrate a selected workload from a source compute node to a destination compute node based on one or more of the bitmaps, wherein the processor is configured to calculate a bitmap for a given workload by calculating respective hash values over at least some of the memory pages used by the given workload, and calculating the bitmap based on the hash values, and wherein the processor is configured to evaluate the bitmap over the hash values of only the memory pages that are modified by the given workload less frequently than a predefined modification rate.

19. A computing system, comprising:

a plurality of compute nodes, which are configured to run multiple workloads that access respective sets of memory pages, and to calculate respective bitmaps for at least some of the workloads, wherein (i) a bitmap of a workload is statistically indicative of a cardinality of the set of memory pages used by the workload, (ii) a union of two or more bitmaps is statistically indicative of the cardinality of a union of the sets of memory pages used by the two or more corresponding workloads, and (iii) an intersection of first and second bitmaps is statistically indicative of an overlap between respective first and second sets of memory pages used by the corresponding workloads; and a processor, which is configured to receive the bitmaps from the compute nodes and to decide, based on one or more of the bitmaps, to migrate a selected workload from a source compute node to a destination compute node, wherein the processor is configured to choose one or both of the selected workload and the destination compute node, based on a selection criterion that is defined over one or more of the bitmaps and aims to maximize the overlap between the memory pages used by the selected workload and the memory pages used by existing workloads on the destination compute node.

* * * * *